July 3, 1923.
F. M. FISCHER
1,460,578
TRACTOR HITCH
Filed Sept. 19, 1921
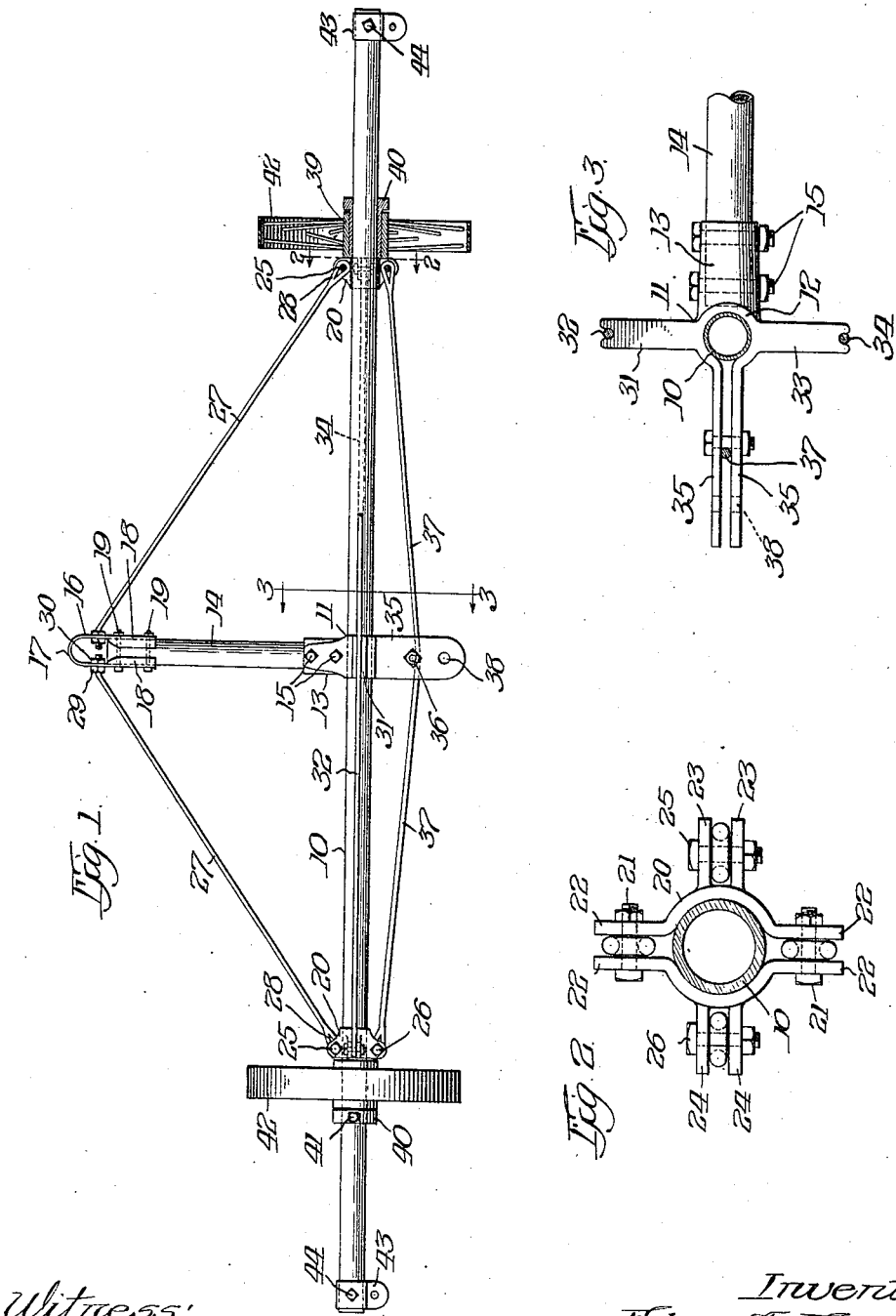
Inventor
Felix M. Fischer,
By Walter M. Fuller
Atty.
Witness:

Patented July 3, 1923.

1,460,578

UNITED STATES PATENT OFFICE.

FELIX MICHEAL FISCHER, OF KEWANEE, ILLINOIS.

TRACTOR HITCH.

Application filed September 19, 1921. Serial No. 501,671.

*To all whom it may concern:*

Be it known that I, FELIX M. FISCHER, a citizen of the United States, residing in the city of Kewanee, county of Henry, and State of Illinois, have invented certain new and useful Improvements in Tractor Hitches, of which the following is a specification.

My invention pertains to features of advantage and efficiency in operation accruing from the employment of a novel type and style of draft appliance or connecting apparatus, more specifically, but not necessarily restrictedly, a tractor-hitch, by means of which a suitable, strong, and effective connection is made between the traction-engine and a plurality of agricultural implements, such as seeders, harrows, and the like, drawn by the tractor during the performance of their usual functions.

One object of the invention is the provision of a draft or hitch appliance of this general character which is simple in structure, effective in the production of the desired results, and economical to manufacture, the improved appliance drawing or pulling along the agricultural implements and maintaining them at all times in proper relation to one another for the correct performance of their work without danger of its breaking or becoming damaged in ordinary service.

To this end, the preferred embodiment of the invention comprises a relatively long pipe, constituting the main beam, to which the seeders, harrows, or other tools are connected, such pipe or tube forming the axle for a pair of coaxial wheels mounted thereon inwardly some distance from its ends, whereby to support the hitch or draft appliance to suitable advantage, the latter being trussed or strengthened between such wheels, and to which central portion the traction-engine is connected by suitable means.

In order that those skilled in this art may have a full and complete understanding of the invention, both from structural and functional standpoints, I have illustrated a preferred incorporation of the invention in physical form in the accompanying drawing, forming a part of this specification and to which reference should be had in connection with the following detailed description, like reference characters referring to the same parts throughout the several views.

In this drawing:

Figure 1 is a partial plan view and partial horizontal section of the improved hitch or draft appliance;

Figure 2 is an enlarged, vertical cross-section on line 2—2 of Figure 1; and

Figure 3 is a similar section on line 3—3 of Figure 1 on a less enlarged scale.

Referring to this drawing and the details of construction illustrated in its plurality of figures, it will be seen that the main member of the draft connection comprises a comparatively-long, horizontal, cylindrical pipe or tube 10 equipped at its center with an appropriately-shaped member designated 11 as a whole and constituting in part struts for brace or truss rods, a socket for a forwardly-extended pipe or draw-bar and a connection for the middle one of the plurality of agricultural implements.

Accordingly, such member 11 has a central apertured portion or hub 12 receiving the pipe 10 and from such hub a socket 13 projects forwardly accommodating the rear end of a short, draw-bar pipe or tube 14, which is fixedly secured therein by two bolts 15, 15 in aligned or registering holes in the interfitted members 13 and 14.

At its front end element 14 is provided with a forging 16 bent to form a loop or eye 17 for the attachment of the traction-engine, the end portions 18, 18 of such loop being curved transversely in opposite directions to unitedly or conjointly form a socket for the reception of the front end of pipe 14, the latter being fastened in such pocket by a pair of bolts 19, 19 extended through holes in the associated parts 14 and 18.

Some distance each side of its central point, pipe 10 is supplied with a pair of sectional or split cast-metal collars 20, 20 securely and fixedly mounted on the pipe by fastening bolts 21, 21 passing through spaced, vertically-disposed ears 22, 22 of the parts of the collar, as shown most clearly in Figure 2.

In the present illustration, each of these collars is composed of two mating independent parts bolted together, but of course they may each comprise a single element, if preferred, split at one side only.

In addition, each collar 20 has diametrically-disposed, spaced, horizontal ears 23, 23 and 24, 24, equipped with bolts 25 and 26, respectively, spanning their gaps for a purpose hereinafter indicated.

A tie or truss rod 27 connects each bolt 25 with the corresponding side of the loop or attachment element 16, and, accordingly, the outer end of each such rod has a loop 28 receiving the correlated bolt 25, the inner end of the rod being screw threaded, bent to pass through a hole in the side of member 16, and supplied with nuts 29 and 30 disposed on opposite sides of and bearing against the opposite surfaces of the corresponding part of the loop element.

Directly above the pipe 10, the member 11 has an upstanding strut portion 31 notched or recessed at its upper end to accommodate the central portion of a bent or cambered truss or tie rod 32 having loop ends encircling the upper bolts 21, 21 of the two collars 20, 20.

In similar manner, below the pipe 10, the part 11 has a depending strut portion 33 recessed at its lower end to receive a lower truss or tie rod 34, looped at its opposite ends to fit over the lower bolts 21, 21 of the pair of companion collars.

Member 11 also has a pair of rearwardly-extended, spaced, horizontal ears 35, 35 equipped with a bolt 36, and a cambered rod 37 extends between such ears bearing on the outer face of the bolt, the ends of the rod having loops or eyes coacting with the bolts 26, 26 of the two collars, the rear ends of the ears 35 being apertured at 38 for the attachment of the central or middle agricultural implement as by means of the usual clevis.

Thus the middle portion of the pipe or tube 10 is trussed and stiffened in four directions, portions of the truss structure affording convenient means for the connections with the tractor and one of the seeders, harrows, or the like.

Just beyond the two truss collars specified, the pipe is supplied with a pair of sleeves 39, 39 with enlarged outer ends 40 bolted at 41 through the pipe thus effectively preventing their displacement or dislodgment.

Each such sleeve forms a bearing for a ground or carrying wheel 42 desirably, though not necessarily, of the steel tire and steel spoke type, each such wheel being prevented from axial movement longitudinally of the pipe by coaction with the adjacent collar and the enlargement of the sleeve.

At its extreme ends, or elsewhere if preferred, the hitch is fitted with forgings 43 bolted thereto at 44 and formed or shaped for connection with the other agricultural tools.

It will be perceived, therefore, that the draft appliance is adequately trussed and strengthened between the carrying or ground wheels, which truss structure acts also to stiffen the parts of the main pipe member beyond the wheels to perform their functions without danger of bending or collapse by reason of the strains and stresses to which they are put.

It will be observed that the long pipe or tube forms the backbone of the structure, that some of the attachments of the draft members are made substantially directly with the truss structures, and that the wheels are mounted directly on the pipe revolving about the axis of the latter.

Such a structure embodies maximum strength for the amount of metal employed, the appliance as a whole including relatively few parts so associated and connected together as to secure great rigidity and strain resisting qualities.

The invention is not limited and restricted to the precise and exact details of construction illustrated and described, but rather it is susceptible to many minor variations and modifications without departure from the substance and essence of the invention and without the sacrifice of any of its substantial or material benefits and advantages.

I claim—

1. In an appliance of the character described, the combination of a substantially-straight metal pipe constituting a draft-beam, a strut member fastened to the middle of said pipe and having a forwardly-extended socket, a forwardly-projecting draw-bar pipe secured in said socket, a pair of collars fastened to said pipe on opposite sides of and remote from said strut member, truss rods connected at their ends to said collars and coacting with the struts of said member, tie rods connecting said collars to the front end portion of said forwardly-extended draw-bar pipe, sleeves on said pipe outwardly beyond said collars but remote from the ends of the main pipe, carrying wheels revoluble about the axis of said draft-beam pipe on said sleeves, means permitting the attachment of a traction appliance to the front end of said draw-bar pipe, and means permitting the attachment of agricultural implements to said main-beam pipe.

2. In an appliance of the character described, the combination of a metal draft-beam pipe, a strut-member fastened to the central part of said pipe, a pair of collars secured to said pipe remote from its ends, top, bottom, and rear truss-rods fastened to said collars and bearing at their middle portions on strut parts of said member, said strut member having a forwardly-extended socket, a draw-bar pipe having its rear end secured in said socket, a loop element having transversely-curved side end portions unitedly forming a socket receiving the front end of said draw-bar pipe, means fastening said loop element to said draw-bar pipe, tie-rods fastened to said collars and each having a bent threaded end extended through a hole in the corresponding side of said loop element, nuts on said threaded ends securing them to said loop element, means to attach a central agricultural implement to said strut-member, sleeves on said draft-beam pipe outwardly beyond said collars but inwardly remote from the ends of said pipe, carrying-wheels revoluble on said sleeves about the axis of said pipe and prevented from longitudinal movement on the latter by cooperation with said collars and enlarged portions of said sleeves, and means to attach agricultural implements to said main-beam pipe outwardly beyond said wheels.

FELIX MICHEAL FISCHER.